United States Patent Office 3,511,081
Patented May 12, 1970

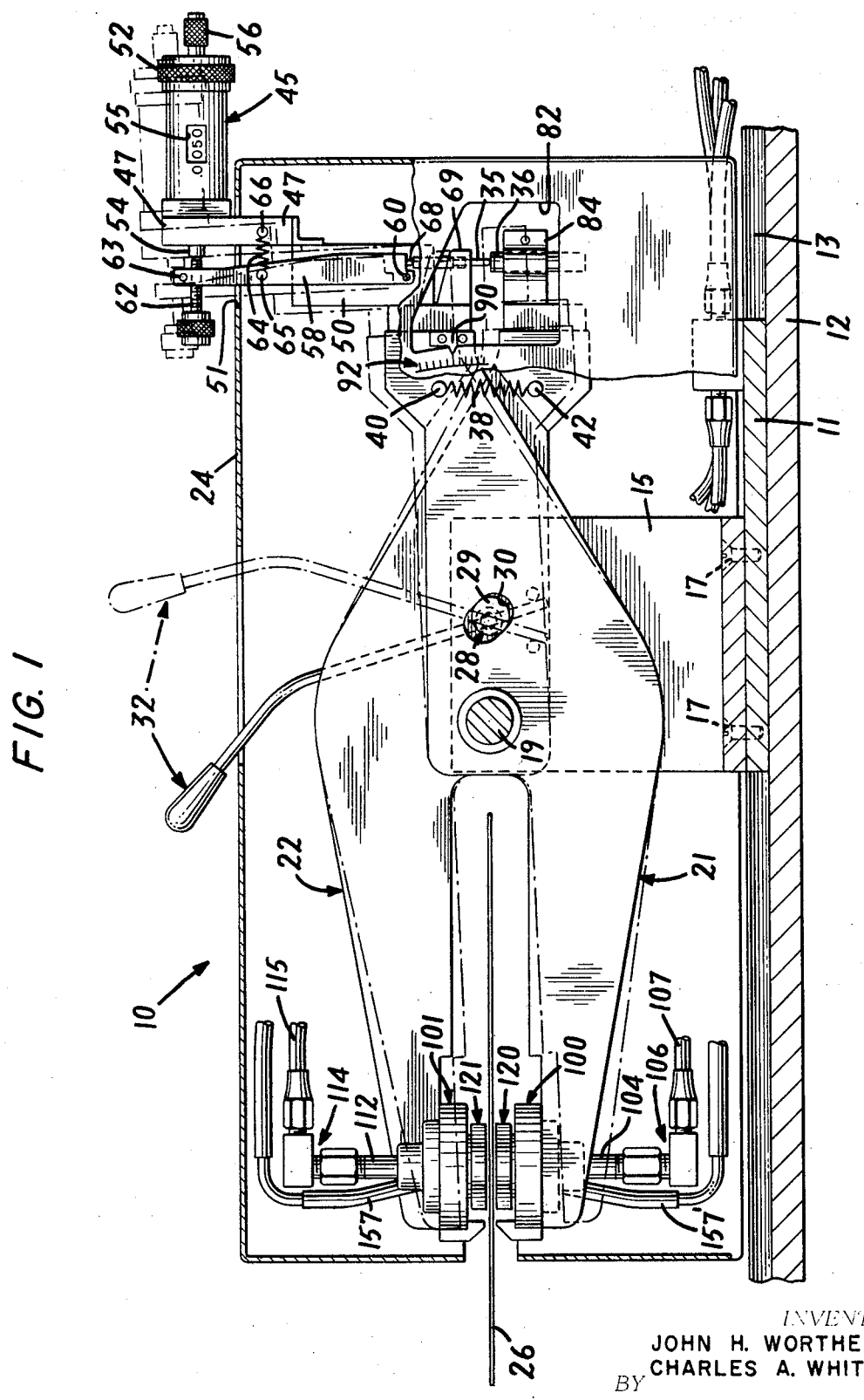

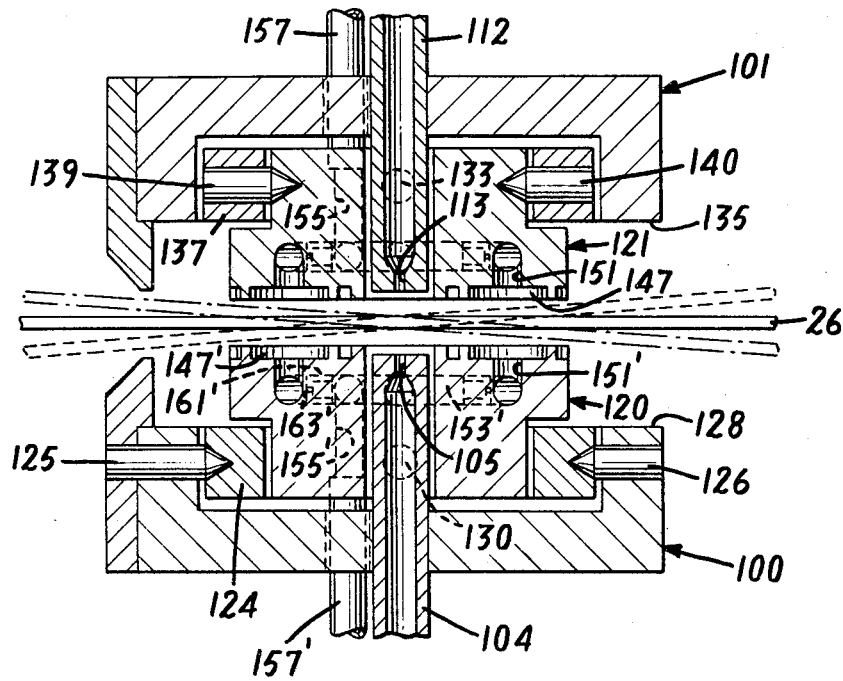
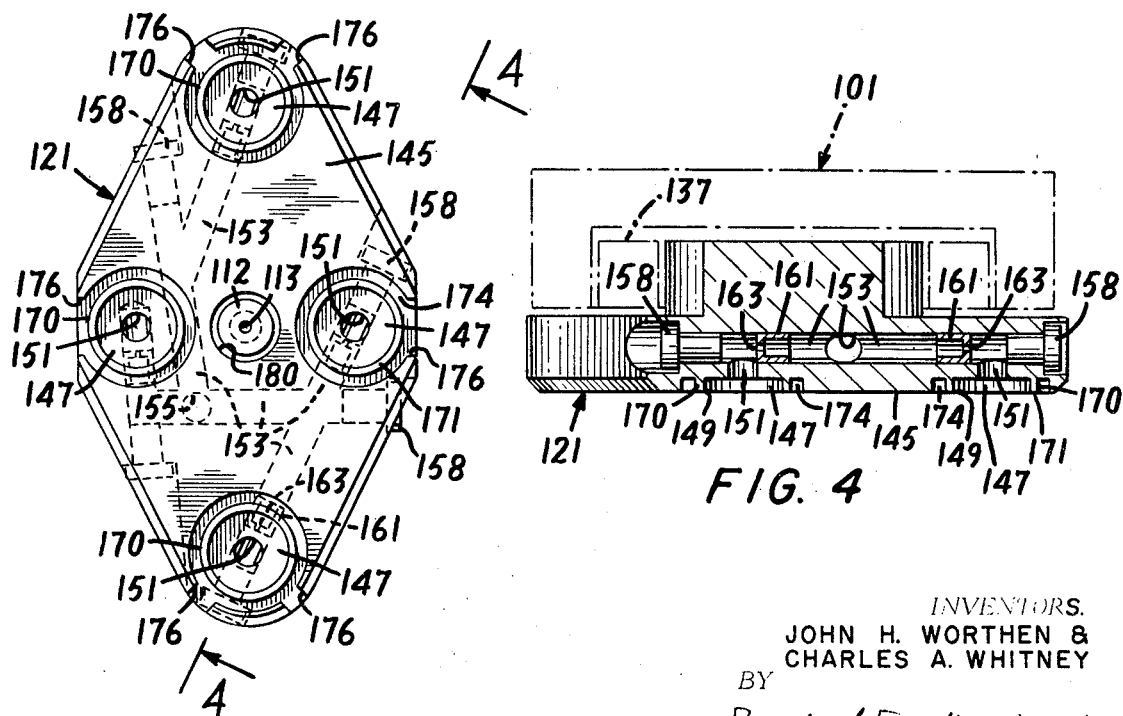

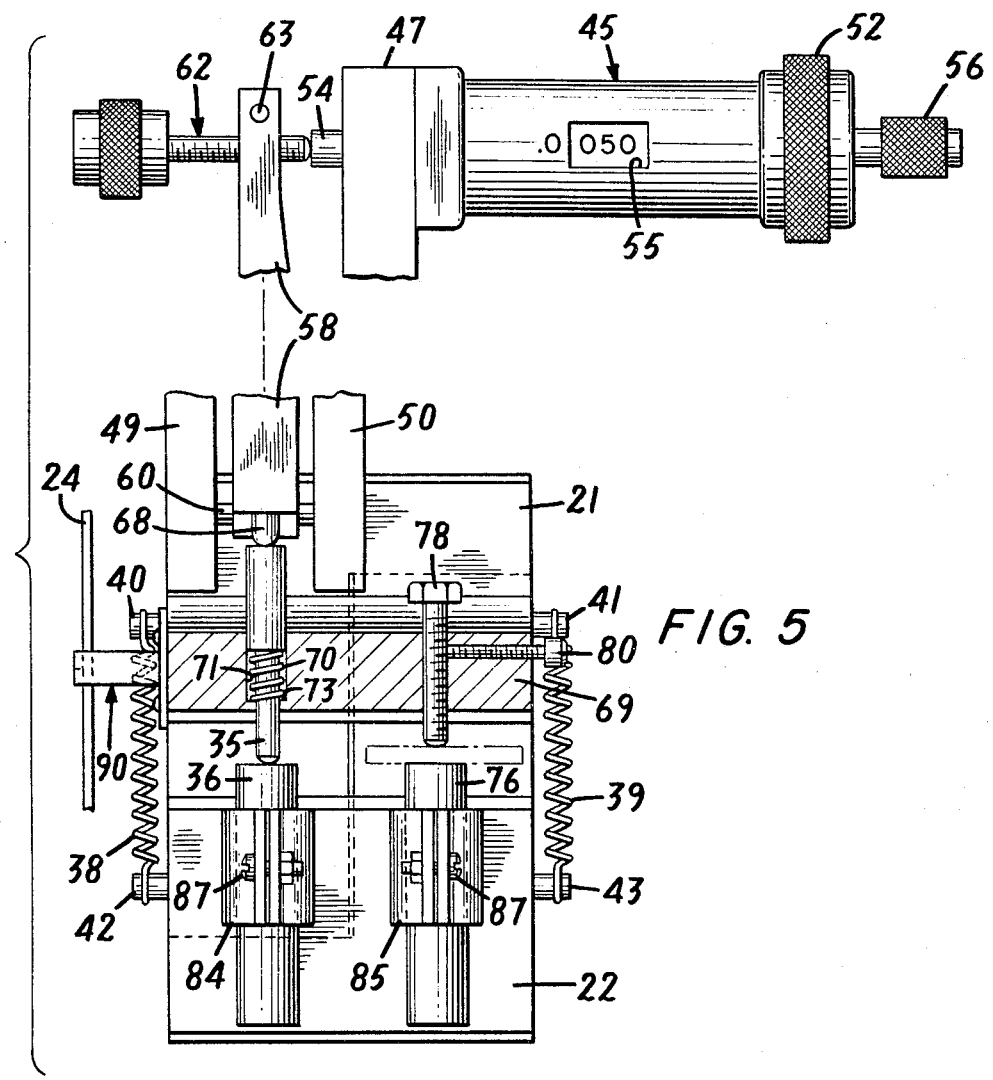
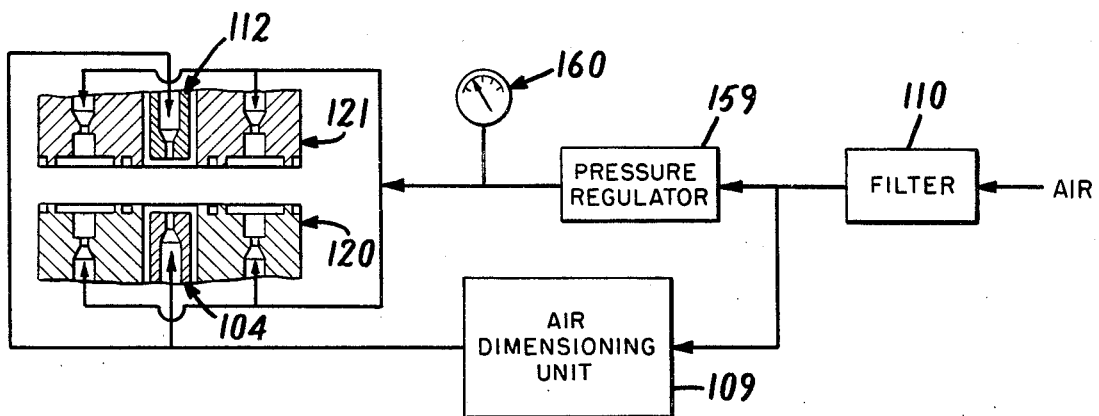
FIG. 5
FIG. 6
INVENTORS.
JOHN H. WORTHEN &
CHARLES A. WHITNEY
BY
Brumbaugh, Free, Graves & Donohue
their ATTORNEYS INVENTORS.
JOHN H. WORTHEN &
CHARLES A. WHITNEY
BY
Brumbaugh, Free, Graves + Donohue
their ATTORNEYS

3,511,081
GAGING METHOD AND APPARATUS
John H. Worthen, Providence, and Charles A. Whitney, Warwick, R.I., assignors to Federal Products Corporation, Providence, R.I., a corporation of Rhode Island
Filed Aug. 28, 1967, Ser. No. 663,793
Int. Cl. G01b 13/08
U.S. Cl. 73—37.5                                     23 Claims

ABSTRACT OF THE DISCLOSURE

A system for locating a gage jaw at a predetermined distance from an object to be measured by urging the gage jaw away from the object with a first force which is proportional to the distance between the gage jaw and the object, and urging the gage jaw toward the object with a second force which balances the first force when the gage jaw is spaced at the predetermined distance from the object.

---

This invention relates to a gaging method and apparatus and, more particularly, to a new and improved method and apparatus for accurately measuring the size of an object. The invention has particular application for measuring the size of an object without contacting the object, and is especially suited for the measurement of moving material.

In the production of continuously moving material such as sheets or strips of steel, brass, aluminum, paper, plastic or the like, the thickness of the material must be constantly checked in order that appropriate adjustments may be promptly made to the mill producing the material so that the size of the material is within the desired tolerances. A gage for measuring such materials is preferably of the non-contacting type in order to avoid damage to either the gage or the strip of material being measured. A continuously moving strip material delivered at a high speed travels in a path which shifts rapidly and irregularly from a nominal position, so that the gage must be mounted to follow changes in the dynamic position of the material while providing an accurate measurement of the material thickness. Similarly, the gage must be able to distinguish wrinkles in a strip of constant thickness from bulges or indentations in the strip where the thickness of the material changes.

The U.S. Pat. No. 2,438,696, which issued Mar. 30, 1948, discloses a prior art type of gage for measuring the thickness of strip material in motion. An air nozzle mounted on each gage jaw senses the distance to the material, but both of the gage jaws are normally in a fixed position and thus cannot follow changes in the dynamic position of the material.

The U.S. Pat. No. 3,194,055, which issued July 13, 1965, discloses another gage for measuring a traveling strip material. An air nozzle mounted on each gage jaw senses the distance to the work and communicates the back pressure to one side of a piston, a counterforce being provided on the opposite side of the piston by air under pressure. The piston is provided with an O-ring seal to insure a fluid-tight sliding fit and also to provide friction to damp the movement of the gage jaw in order to prevent hunting or oscillation.

A similar gage is disclosed in the U.S. Pat. No. 3,213,-671, which issued Oct. 26, 1965. Again, in air nozzle senses the distance to the work and communicates the back pressure to one side of a piston, the counterforce on the opposite side of the piston being supplied by the weight of the gage jaws.

Such prior art arrangements for displacing the gage jaws by means of a piston actuated by back pressure communicated thereto from an air nozzle spaced from the material being gaged necessarily prevent the complete and rapid displacement of the gage jaws in response to changes in the dynamic position of the material. This is due to the friction produced by the fluid-tight fit of the jaw displacing piston, such friction damping the movement of the gage jaws. In addition, a time lag is necessarily introduced in the response of the gage jaws because of the time required to communicate the back pressure sensed adjacent the material to the remotely located gage adjusting piston.

Accordingly, it is an object of the present invention to provide a new and improved gaging method and apparatus which avoids the disadvantages of conventional gaging systems.

Another object of the invention is to provide a gaging system which automatically adjusts itself to accurately measure a moving object regardless of changes in the position of the object.

A further object of the invention is to provide a system for automatically locating the measuring jaw of a gage in a predetermined relation to the object being measured, regardless of the position of the object.

These and other objects of the invention are attained by urging the gage jaw away from the object to be measured with a first force proportional to the distance between the gage jaw and the object by producing a pressure between a surface coupled to the gage jaw and the adjacent surface of the object proportional to the distance between the surface and the object, and urging the gage jaw toward the object with a second force which balances the first force when the gage jaw is spaced at a predetermined distance from the object.

In one embodiment, a pair of gage jaws are mounted for movement together and are disposed on opposite sides of the object, the gage jaws are maintained equidistant from the object, and the distance is sensed between each gage jaw and the object. In another embodiment, the gage jaws are urged apart with a first force which is proportional to the distance between each gage jaw and the object and are urged together with a second force which balances the first force when each gage jaw is at a predetermined distance from the object, and the spacing between the gage jaws is measured.

Other objects and advantages of the invention will be apparent from a reading of the following detailed description in conjunction with the accompanying drawings showing preferred embodiments, wherein:

FIG. 1 is an elevational view in section of a typical gaging apparatus in accordance with one embodiment of the invention;

FIG. 2 is an enlarged sectional view of a portion of the apparatus of FIG. 1;

FIG. 3 is a view from below of the upper locator and upper measuring nozzle of FIG. 2;

FIG. 4 is a sectional view taken in a plane indicated by the line 4—4 of FIG. 3 and looking in the direction of the arrows;

FIG. 5 is an enlarged end elevational view of the apparatus of FIG. 1, the micrometer being 90° out of position for clarity;

FIG. 6 is a schematic representation of the fluid circuitry to be used in conjunction with the gaging apparatus of FIG. 1;

Figure 9:
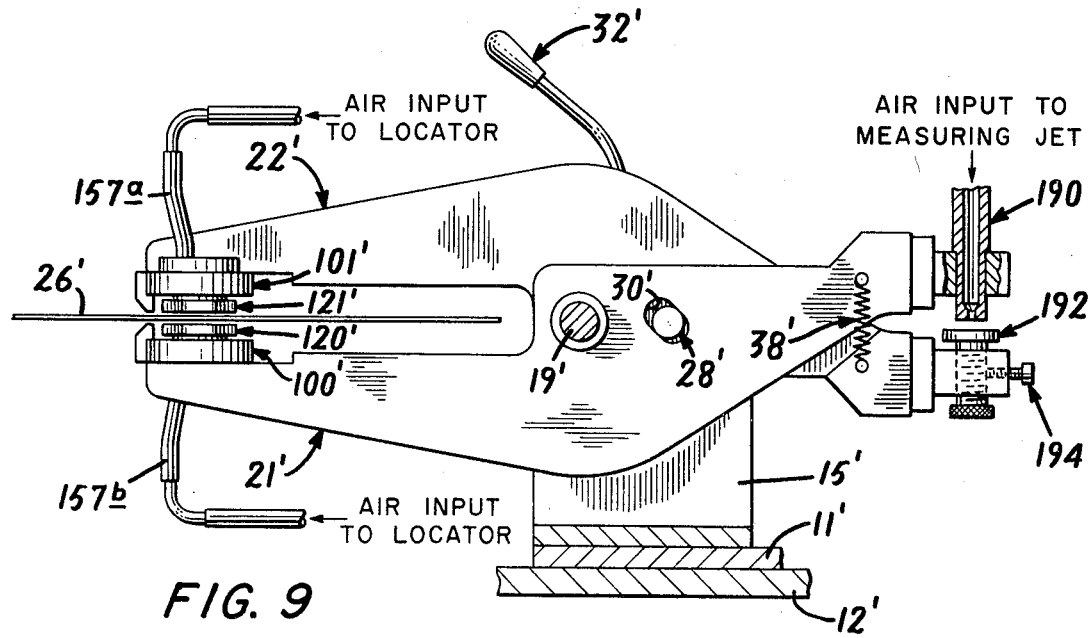
FIG. 9 is an elevational view in section of gaging apparatus according to another embodiment of the invention.

In the typical embodiment of the invention shown in FIGS. 1–8, the gaging apparatus 10 is mounted on a base plate 11 which is slidably received on a foundation or bed 12, the bed having a wedge portion 13 adapted to fit snugly with a mating surface of the base plate 11, to enable the gaging apparatus to be slid into or away from the gaging position illustrated in FIG. 1. A clamp (not shown) is provided on the base plate 11 and may be actuated to engage the wedge portion 13 so that the gaging apparatus may be releasably locked at any desired position on the bed 12. The gage may also be adjusted vertically by a suitable conventional mount (not shown) by which the bed 12 may be raised or lowered.

A generally U-shaped support frame 15 is secured to the base plate 11 by a plurality of screws 17, and a shaft 19 is secured to and extends between the two upwardly extending portions of the support frame 15. A pair of gage jaws 21 and 22 are mounted for rotation about the shaft 19 by means of suitable conventional anti-friction bearings (not shown), which may be roller bearings, for example. A protective cover 24 mounted on the support frame 15 protects the gage jaws and the associated equipment from dirt, grit, etc., as well as from possible damage should the operator inadvertently strike the apparatus.

The gage jaws 21 and 22 are mounted as the arms of a scissor arrangement, the front end of the gage jaws being disposed on opposite sides of the strip of material 26 whose thickness is to be measured. The front end of each gage jaw mounts a measuring nozzle for sensing the distance to the adjacent surface of the material 26 as well as location apparatus for maintaining the measuring nozzles equidistant from the material. This will be discussed in detail hereinafter.

A shaft 28 is rotatably received in the gage jaw 22 and is formed with an eccentric portion 29 which extends into an elongated recess 30 formed in the gage jaw 21. A handle 32 secured to the shaft 28 permits the operator to rotate the shaft to separate the gage jaws before sliding the gage along the bed 12 into or away from its measuring position, the separation of the jaws resulting from the camming action of the eccentric 29 against the walls of the recess 30.

The spacing between the measuring nozzles may be adjusted to a predetermined distance by means of either a micrometer direct setting arrangement or a more accurate comparative method using a gage block. When the micrometer adjustment is employed, an adjustable contact 35 mounted at the back end of the gage jaw 21 is held against a reference anvil 36 mounted at the back end of the gage jaw 22 by means of a pair of springs 38 and 39, the upper end of each spring being secured to a different one of a pair of mounting posts 40 and 41 extending from the gage jaw 21. The lower end of each spring is secured to a different one of the mounting posts 42 and 43 extending from the gage jaw 22 (see FIG. 5).

The adjustable contact 35 is actuated by a conventional micrometer movement 45, which is mounted on a support plate 47 secured to a pair of spaced support members 49 and 50 which in turn are mounted on the back end of the gage jaw 21. The support members 49 and 50 extend through an aperture 51 in the protective cover 24, so that the micrometer movement and its supporting structure are free to rock with the gage jaws (as shown in phantom in FIG. 1). Rotation of the adjustment knob 52 displaces the micrometer spindle 54 axially in the conventional fashion, the displacement of the spindle being indicated by the digits visible through a window 55 in the micrometer. The spindle 54 may be locked at any desired position by means of a locking knob 56.

While such a conventional micrometer would normally indicate the displacement of the spindle 54 to the nearest 0.001 inch, the displacement of the contact 35 is reduced by a factor of ten with respect to that of the spindle 54, so that the spacing between the measuring nozzles at the front ends of the gage jaws may be adjusted by the micrometer 45 to the nearest 0.0001 inch. Accordingly, the decimal point in the micrometer readout is moved one place to provide a direct indication of the measuring nozzle separation (see FIGS. 1 and 5).

The ten-to-one reduction is provided by a lever arm 58 which is pivotally mounted to the support members 49 and 50 about a pivot shaft 60 extending therebetween. The end of the lever arm remote from the pivot shaft threadedly receives a micrometer zero setting member 62, the contact end of which is held in engagement with the micrometer spindle 54 by means of a spring 64 which is secured to a pair of mounting posts 65 and 66 extending from the lever arm 58 and the support plate 47, respectively. The micrometer zero set 62 may be secured in the desired position by means of a locking screw 63. A contact pin 68 extending from the lever arm 58 is spaced from the axis of the pivot shaft 60 by an amount equal to one-tenth the distance that the micrometer zero set 62 is spaced therefrom in order to provide the desired ten-to-one reduction in the displacement of the contact 35 with respect to that of the spindle 54. The lever arm contact 68 bears against the end of the contact 35 remote from that which engages the micrometer reference anvil 36.

Engagement between the contacts 68 and 35 is maintained by means of a compression spring 70 which is disposed around a reduced diameter portion of the contact 35 in a chamber 71 formed in a protruding portion 69 of the gage jaw 21, the contact 35 being slidably received in the chamber 71. The compression spring 70 acts between a shoulder 73 formed by a reduced diameter portion of the chamber 71 and the enlarged diameter portion of the contact 35 to urge the contact upwardly and maintain engagement between the upper end of the contact 35 and the lever arm contact 68. It should be understood that the springs 64 and 70 are selected so that the spring 64 acts against the action of the spring 70 to maintain engagement between the micrometer zero set 62 and the micrometer spindle 54.

The gage can measure the size of the material 26 to an accuracy traceable to standards at the National Bureau of Standards by spacing the measuring nozzles at the front ends of the gage jaws by means of a master gage block (shown in phantom in FIG. 5) placed between gage block contacts mounted on the back ends of the gage jaws. Thus, a gage block reference anvil 76 mounted on the back end of the gage jaw 22 cooperates with an adjustable gage contact 78 which is threadedly received in the portion 69 extending from the gage jaw 21. The adjustable contact 78 may be secured in any desired position by means of a locking screw 80.

When the distance between the measuring nozzles is to be set by means of a gage block, the gaging contact 35 is lifted out of engagement with its reference anvil 36 by rotating the micrometer knob 52 in a proper direction to displace the micrometer spindle 54 to the right as viewed in FIG. 5. A window 82 in the protective cover 24 enables the operator to easily place a gage block between, or remove it from, the gage block contacts 76 and 78.

The reference anvils 36 and 76 are mounted on the back end of the gage jaw 22 by means of a pair of collars 84 and 85, respectively, which slidably receive the reference anvils. The anvils are releasably locked in the collars by a pair of nuts and bolts 87 which are received in the flange portions of the collars. This enables the reference anvils to be initially adjusted when the gage is installed, and it also permits the anvils to be changed should they become worn after extended use.

An index pointer 90 mounted on the gage jaw 21 extends through the window 82 in the protective cover 24 and cooperates with an index scale 92 on the protective cover. This index permits the gage to be adjusted vertically with respect to the dynamic position or pass line of the material 26 either when the gage is originally set up or if it should require repositioning. While the strip 26 is traveling, the mount for vertically displacing the bed 12 is adjusted to raise or lower the gage as necessary until the index pointer 90 is at the neutral indication on the scale 92.

A pair of gimbal supports 100 and 101 are mounted in opposed facing relation at the front ends of the gage jaws 21 and 22, respectively. Mounted to, and extending upwardly through, the lower gimbal support 100 is a nozzle 104, the orifice 105 of which is communicated through a fitting 106 and a flexible hose 107 to a suitable conventional back pressure gaging unit 109, such as the "Dimensionaire" equipment of Federal Products Corporation. As is well known to the art, a fluid (usually air) under pressure is supplied to the nozzle 104 which directs an air jet against the material 26. The back pressure in the air system is proportional to, and thus a measure of, the distance between the nozzle and the adjacent surface of the material 26. The air under pressure is supplied to the air gaging unit from a suitable source (not shown) through a conventional air filter 110.

Similarly, an upper measuring nozzle 112 is mounted to, and extends downwardly through, the upper gimbal support 101, the upper nozzle being disposed generally coaxially of the lower nozzle 104. The orifice 113 of the upper nozzle is communicated through a fitting 114 and a flexible hose 115 to the air gaging unit 109. The two measuring nozzles are preferably connected to a single readout so that the back pressures obtained from the two nozzles are averaged to compensate for slight displacements of the material 26 from a position equidistant from the measuring nozzles.

A pair of hydrostatic locators 120 and 121 are gimbal mounted to the gimbal supports 100 and 101, respectively, as follows. A lower gimbal ring 124 is pivotally mounted on a pair of pivot pins 125 and 126 extending inwardly from an upstanding annular flange 128 formed integrally with the lower gimbal ring 100. The axis of the pivot pins 125 and 126 intersects the axis of the lower nozzle 104 perpendicularly thereof. A second pair of pivot pins 130 extending inwardly from the gimbal ring 124 pivotally mount the lower locator 120, and the axis of the pivots 130 intersects perpendicularly the axis of the pivots 125 and 126.

Similarly, a pair of pivots 133 extending inwardly from the depending annular flange portion 135 of the upper gimbal support 101 pivotally mount an upper gimbal ring 137. The axis of the pivots 133 intersects perpendicularly the axis of the upper nozzle 112. The upper hydrostatic locator 121 is pivotally mounted to the upper gimbal ring 137 by a pair of pivots 139 and 140 secured to and extending inwardly of the upper gimbal ring 137, the axis of the pivots 139 and 140 intersecting perpendicularly the axis of the pivots 133.

The hydrostatic locators 120 and 121 are of identical construction, and so only the upper locator 121 will be described in detail. The locator 121 is formed with a lower planar surface 145 in which are formed four cylindrical chambers 147, each of the chambers having a discharge aperture 149 disposed in the plane of the planar surface 145. Each chamber 147 is communicated through a vertical passageway 151 and a plurality of horizontal interconnected passageways 153 with a vertical entrance passageway 155, which in turn is communicated through a flexible hose 157, a conventional pressure regulator 159 and the filter 110 to the source (not shown) of air under pressure. (A plurality of plugs 158 seal the discharge apertures which are formed when the pasageways 153 are bored.) The pressure regulator 159 may be adjusted to provide a desired constant pressure to the locators 120 and 121, this constant pressure being indicated by a suitable conventional gage 160.

Disposed in a different one of the passageways 153 between each chamber 147 and the vertical entrance passageway 155 is a plug 161 provided with a restriction orifice 163. The cross-sectional dimensions of the passageways 151, 153 and 155 with respect to that of the restriction 163 are such that substantially the only restriction to the fluid flow from the pressure regulator 159 to the discharge apertures 149 is that caused by the orifices 163. Thus, the gage 160 indicates the pressure in the passageways 153 upstream of the plugs 161.

The lateral wall of each chamber 147 is formed by the interior surface of an annular rim 170, the outer workfacing surface 171 of which is in the plane of the planar surface 145. Surrounding each rim 170 is an annular groove 174 which is laterally vented at 176. In this way, when the locator 121 is in the normal spaced relation to the material 26, air is directed through the passageways 155 and 153, the restriction orifice 163 and the passageway 151 to the chamber 147, from which it escapes between the rim surface 171 and the adjacent surface of the material 26 to the annular recess 174 and then through one or more of the vents 176 to the surrounding atmosphere. This prevents instability which might otherwise be caused by the buildup of air pressure between the planar surface 145 and the adjacent surface of the material 26.

A bore 180 extends through the locator 121 centrally of the four chambers 147 and receives the upper measuring nozzle 112, the spacing between the bore and the outer peripheral surface of the nozzle being sufficient to enable the locator 121 to pivot in any direction without striking the nozzle. This enables the planar surface 145 of the locator to remain in substantially spaced parallel relation to the material 26 regardless of any tilting of the material either in its direction of travel or transversely thereto.

Similarly, the lower locator 120 is provided with four chambers 147′ which are communicated through the passageways 151′, 153′ and 155′ to a flexible hose 157′ which is connected to the pressure regulator 159. A plug 161′, having a restriction orifice 163′, is provided in the passageway 153′ between each chamber 147′ and the passageway 155′.

Figure 7:
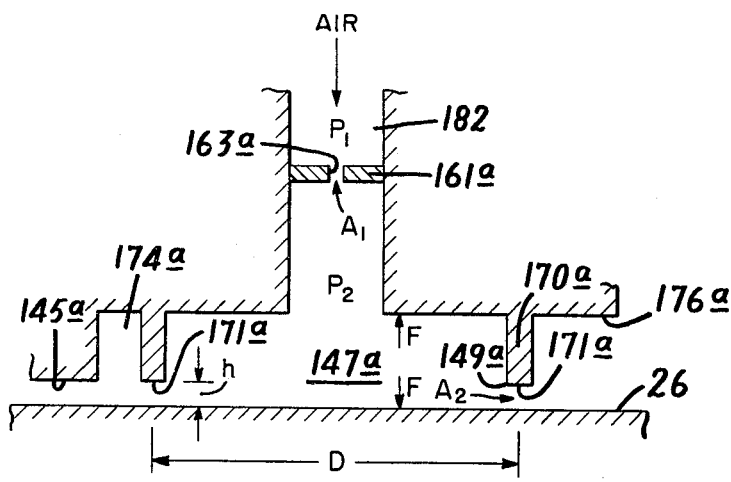
FIG. 7 is a simplified schematic illustration of a portion of a locator adjacent the material being measured to illustrate the operation of the locator.

FIG. 7 shows a simplified schematic illustration of a portion of the locator of FIGS. 3 and 4. Corresponding parts are identified with the same reference numerals, a suffix $a$ being added to the numerals in FIG. 7. Air under pressure is introduced to a chamber 182, which corresponds to the portions of the passageways 153 upstream of the plug 161. The air passes through the orifice 163$a$ of the restriction 161$a$ into the chamber 147$a$, the discharge aperture 149$a$ of which is partially closed by the material 26 being measured. The air escapes from the chamber 147$a$ between the surface 171$a$ of the rim 170$a$ and the adjacent surface of the material 26 into the annular recess 174$a$, and thence to the surrounding atmosphere through the vent 176$a$. In view of the restriction 161$a$ in the passageway between the chambers 182 and 147$a$, the pressure $P_1$ in the chamber 182 remains constant at the value determined by the pressure regulator 159. The pressure $P_2$ in the chamber 147$a$, however, is dependent upon the effective escape area $A_2$ between the annular rim 170$a$ and the material 26. In particular, the area $A_2$ equals $\pi D h$ where D is the diameter of the annular rim 170$a$ and $h$ is the distance between the rim surface 171$a$ and the material 126.

Figure 8:
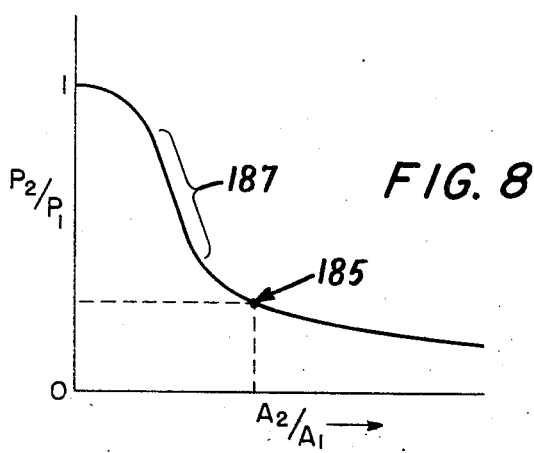
FIG. 8 is a graphic representation illustrating the relationship between the pressure between the locator portion and the material of FIG. 7 as a function of the distance between the locator and the material.

The relationship between the pressure $P_2$ in the chamber 147$a$ and the effective escape area $A_2$ is shown in the characteristic curve of FIG. 8. This characteristic is a normalized curve, i.e., the relationship between the ratio $P_2/P_1$ and the ratio $A_2/A_1$. $P_1$ is the constant input pressure in the chamber 182, and $A_1$ is the area of the restriction orifice 163$a$ and is also a constant. As the spacing between the locator and the material 26 decreases, the pressure $P_2$ in the chamber 147a increases, until the limiting condition is reached in which the rim surface 171a is in contact with the material 26. The effective escape area $A_2$ is then zero and no air flows through the locator, so that the pressure $P_2$ equals the input pressure $P_1$. If, on the other hand, the material 26 is removed from its normal position between the two locators, the pressure $P_2$ in the chamber 147a approaches zero gage pressure, i.e., atmospheric pressure.

The pressure $P_2$ in the chamber 147a produces a force which acts between the locator and the material 26 to urge the locator (and the associated gage jaw coupled thereto) away from the strip material. This force F is given by the relationship $F=(\pi D^2/4)P_2$ and is proportional to the distance between the locator and the strip material.

When the gage jaws 21 and 22 have been set up for measuring a strip material of a particular thickness, there is preferably approximately 0.003 inch between each of the locators 120 and 121 and the adjacent surface of the material when flat, on-size stock is passing through the gage. This normal operating condition preferably corresponds to the point 185 on the normalized pressure-area characteristic of FIG. 8. This is on the relatively low spring rate portion of the curve adjacent the steeper portion indicated at 187 which is the relatively high spring rate portion thereof. Thus, each of the locators might develop a force of approximately one-half pound between the locator and the strip material when the material is equidistant from the locators and the pressure $P_2$ in each of the chambers 147a corresponds to the normal operating point 185. If the strip material 26 should be displaced toward one of the locators thereby reducing the effective escape area $A_2$ from each of the chambers 147a thereof, a relatively large corrective force is developed as the operation enters the steeper portion 187 of the characteristic curve. At the same time, the corresponding displacement of the material away from the other locator reduces the force developed between this other locator and the material. Thus, the corrective forces are applied immediately and directly between the strip material and the gage jaws without the use of any moving parts.

Oscillation or hunting of the locators is avoided by means of a damping effect which inhibits relative motion between each locator and the strip material, such relative motion occurring when the strip material and one of the locators approach each other. A pumping action occurs in which the air between the adjacent surfaces of the locators and the material is forced out as the surfaces approach each other and is sucked in as they separate. There is considerable friction associated with this pumping action, and this creates a damping effect due to an absorption of energy caused by the friction. In addition, work must be done to expel additional air through the decreased effective escape area or to reduce the amount of escaping air as the spacing between the locator and the object being measured decreases or increases, respectively. Accordingly, the damping action complements the corrective forces developed by the locators to insure that the measuring nozzles remain equidistant from the strip material. In this embodiment of the invention the front ends of the gage jaws are set at a predetermined constant spacing, and so the measuring nozzles are maintained at a substantially constant distance from the midpoint of the strip material along the dimension being measured.

In operation, the distance between the measuring nozzles 104 and 112 may be adjusted for the particular size of the material to be measured by means of the micrometer 45 to the nearest 0.0001 inch. The micrometer is generally used for adjusting the nozzle spacing when the material is being processed toward final size. The locators 120 and 121 maintain the measuring nozzles 104 and 112 equidistant from the material being measured to within a tolerance of approximately 0.0001 inch. Such a displacement of the material from a position equidistant between the measuring nozzles does not adversely affect the accuracy of the readout provided by the air gaging unit 109, inasmuch as the "Dimensionaire" equipment of Federal Products Corporation has a range of 0.003 inch and compensates for the amount by which the material might be displaced from its equidistant position by averaging the back pressures from each of the measuring nozzles. Inasmuch as each scale division of the "Dimensionaire" equipment represents 0.00005 inch, the slightest change in the thickness of the strip material from the desired value is immediately apparent.

The gage may be used to measure material having a thickness in the range of approximately 0.0005 inch to 0.050 inch or more, for example, and the material is maintained equidistant from the two measuring nozzles regardless of any tilting or bowing of the material either in the direction of travel or transversely thereto, inasmuch as the measuring nozzles are disposed centrally of the locators and the locators are gimbal mounted to the gage jaws. As the strip material fluctuates from its nominal dynamic position, the forces developed between the locators and the material together with the above described damping action inhibiting relative motion between the material and the locators insure that the gage jaws move together about the shaft 19 as necessary to maintain the material equidistant between the measuring nozzles.

The micrometer 45 may be calibrated by first placing a 0.050 inch gage block between the measuring nozzles. This calibrating gage block is provided with a nominal 0.050 inch skirt in order to simulate the condition prevailing when the strip material 26 is disposed between the gage jaws. The micrometer is then adjusted by means of the knob 52 until it indicates 0.050 inch, and then the zero adjustment 62 is adjusted until the gaging unit 109 reads zero.

When the strip material 26 is processed for final size, the gage is preferably adjusted by means of a gage block between the contacts 76 and 78. A standard set of gage blocks (0.100 inch to 0.150 inch) may be used to measure material having a thickness in the range of 0.0005 inch to 0.050 inch in the following manner. The 0.050 inch skirted gage block is placed between the measuring nozzles at the front ends of the gage jaws, and a 0.150 gage block is placed between the contacts 76 and 78. Then the adjustable contact 78 is set until the air gaging unit 109 reads zero, after which the adjustable contact 78 is locked in place by the locking screw 80.

FIG. 9 shows another embodiment of the invention. Elements common to the tow embodiments are indicated with the same reference numerals, primes being added in FIG. 9. Thus, a pair of gage jaws 21′ and 22′ are pivotally mounted around a shaft 19′ by suitable conventional anti-friction bearings (not shown). A pair of hydrostatic locators 120′ and 121′ are mounted on the front ends of the gage jaws 21′ and 22′ by means of a pair of gimbal supports 100′ and 101′, respectively. The upper and lower locators 121′ and 120′ are communicated through a pair of flexible hoses 157a and 157b, respectively, to a conventional pressure-regulated source of air under pressure (not shown), and the two locators, which are identical to the locators of the first embodiment, maintain the two gage jaws equidistant from the strip material 26′ being measured, as before. In this embodiment, however, a pair of springs 38′ acting between the back ends of the gage jaws urge the front ends of the gage jaws toward the material 26′ with a substantially constant force, the springs 38′ being selected to have a substantially constant spring rate. Accordingly, the spacing between each of the locators and the adjacent surface of the material 26′ is maintained at a constant distance, the distance being that at which the force generated between each locator and the strip material urging the locator away from the material balances the force exerted by the springs 38' urging the front ends of the gage jaws together.

With each gage jaw spaced at a constant predetermined distance from the strip material, the thickness of the material is measured by measuring the distance between the gage jaws. In particular, a measuring nozzle 190, which is communicated to a suitable conventional air gaging unit (not shown), is mounted on the back end of the gage jaw 21' and cooperates with a reference anvil 192 threadedly mounted on the back end of the gage jaw 22'. A locking screw 194 permits the reference anvil 192 to be secured in any desired position. The air gaging unit may be zeroed by appropriate adjustment of the reference anvil with a suitable skirted gage block of the required size between the locators 120' and 121'.

Although this invention has been described with reference to specific embodiments, modifications and variations will readily occur to those skilled in the art. Therefore, the invention is not to be construed as limited to the specific embodiments described, but all such variations and modifications are included within the intended scope of the invention as defined by the following claims.

We claim:

1. Gaging apparatus for measuring the size of an object adapted to be placed in gaging relation to the object comprising:
   a gage jaw adapted to be displaced toward and away from the object when the apparatus is in gaging relation thereto,
   means mounted on the gage jaw for exerting a locating force on the gage jaw for locating the gage jaw in predetermined relation to the object,
   means forming at least one first chamber in the locating means, each first chamber having an inlet passageway and a discharge aperture, each discharge aperture being partially closed by the object being measured when the gaging apparatus is in gaging relation to the object,
   means forming a second chamber communicating with each inlet passageway and adapted to be connected to a source of fluid under pressure, each inlet passageway forming a restriction for fluid flowing therethrough from the second chamber to each first chamber, whereby the pressure in each first chamber is proportional to the distance between the locator means and the object, the entire locating force exerted on the gage jaw by the locating means being developed by the pressure in each first chamber, and
   means coupled to the gage jaw for indicating the size of the object in response to the distance between the gage jaw and a reference position and the distance between the gage jaw and the object.

2. Apparatus according to claim 1 including means for urging the gage jaw toward the object with a substantially constant force of a magnitude which balances the force exerted on the gage jaw by the pressure in each first chamber when the gage jaw is spaced a predetermined distance from the object, and wherein the size indicating means includes means for sensing the distance between the gage jaw and the reference position.

3. Gaging apparatus for measuring the size of an object adapted to be placed in gaging relations to the object comprising:
   a gage jaw adapted to be displaced toward and away from the object when the apparatus is in gaging relation thereto,
   means mounted on the gage jaw for locating the gage jaw in predetermined relation to the object, the locating means maintaining the gage jaw at a predetermined distance from the midpoint of the object along the dimension being measured,
   means forming at least one first chamber in the locating means, each first chamber having an inlet passageway and a discharge aperture, each discharge aperture being partially closed by the object being measured when the gaging apparatus is in gaging relation to the object,
   means forming a second chamber communicating with each inlet passageway and adapted to be connected to a source of fluid under pressure, each inlet passageway forming a restriction for fluid flowing therethrough from the second chamber to each first chamber, whereby the pressure in each first chamber is proportional to the distance between the locator means and the object, and
   means coupled to the gage jaw for indicating the size of the object in response to the distance between the gage jaw and the midpoint of the object and the distance between the gage jaw and the object, the size indicating means including air jet means mounted on the gage jaw for sensing the distance between the gage jaw and the object.

4. Apparatus according to claim 3 including a second gage jaw disposed in spaced relation to the first gage jaw and adapted to be placed on the opposite side of the object to be measured, and second locating means mounted on the second gage jaw for maintaining the second gage jaw at the predetermined distance from the midpoint of the object along the dimension being measured.

5. Gaging apparatus for measuring the size of an object adapted to be placed in gaging relation to the object comprising:
   a gage jaw adapted to be displaced toward and away from the object when the apparatus is in gaging relation thereto,
   means coupled to the gage jaw for indicating the size of the object in response to the distance between the gage jaw and a reference position and the distance between the gage jaw and the object,
   locator means mounted on the gage jaw for urging the gage jaw away from the object with a force proportional to the distance between the gage jaw and the object, the locator means being independent of the size indicating means, and
   means for urging the gage jaw toward the object with a force of a magnitude which balances the force exerted on the gage jaw by the locator means when the gage jaw is spaced a predetermined distance from the object.

6. Gaging apparatus for measuring the size of an object adapted to be placed in gaging relation to the object comprising:
   a pair of gage jaws disposed in spaced relation to each other and adapted to be placed on opposite sides of the object to be measured,
   means coupled to the gage jaws for indicating the size of the object in response to the distance between the gage jaws and the distance between each gage jaw and the adjacent surface of the object, and
   locator means mounted on each gage jaw for urging the associated gage jaw away from the object with a force proportional to the distance between the gage jaw and the object, the locator means being independent of the size indicating means.

7. Apparatus according to claim 6 wherein each locator means includes means forming at least one first chamber, each first chamber having an inlet passageway and a discharge aperture, each discharge aperture being partially closed by the object being measured when the gaging apparatus is in gaging relation to the object, and means forming a second chamber communicating with each inlet passageway and adapted to be connected to a source of fluid under pressure, the inlet passageways forming restrictions for fluid flowing therethrough from the second chamber to the first chambers, whereby the pressure in each first chamber is proportional to the distance between the associated locator means and the adjacent surface of the object.

8. Apparatus according to claim 6 wherein the size indicating means includes air jet means mounted on each gage jaw for sensing the distance between each gage jaw and the adjacent surface of the object, and including means for maintaining the air jet means at a predetermined spacing.

9. Apparatus according to claim 6 including means for urging the gage jaws together with a substantially constant force of a magnitude which balances the force exerted on the gage jaws by the locator means when the associated gage jaw is spaced a predetermined distance from the object, and wherein the size indicating means includes means for sensing the distance between the gage jaws.

10. Gaging apparatus for measuring the size of an object adapted to be placed in gaging relation to the object comprising:
a pair of gage jaws disposed in spaced relation to each other,
air jet means mounted on each gage jaw for sensing the distance between the gage jaw and the object, and
locator means mounted on each gage for maintaining the air jet means substantially equidistant from the object, the locator means being independent of the air jet means.

11. Apparatus according to claim 10 including anti-friction mounting means for the gage jaws, and means for damping relative motion between each gage jaw and the object.

12. Apparatus according to claim 10 including pressure responsive means coupled to the air jet means for indicating the size of the object.

13. Apparatus according to claim 10 wherein the gage jaws are mounted for movement together with respect to the object, and each locator means exerts a force on its associated gage jaw in accordance with the distance between its associated gage jaw and the object.

14. Apparatus according to claim 10 including means for adjusting the spacing between the air jet means in accordance with the size of the object to be measured.

15. Apparatus according to claim 10 wherein each locator means includes means forming a first chamber having an inlet passageway and a discharge aperture, the inlet passageway adapted to be connected to a source of fluid under pressure, and the discharge aperture being operatively associated with the object being measured when the gaging apparatus is in gaging relation to the object.

16. Apparatus according to claim 15 wherein each locator means also includes means forming a second chamber communicating the inlet passageway of the first chamber with the source of fluid under pressure, the inlet passageway forming a restriction for fluid flow therethrough, whereby the pressure in the first chamber is proportional to the distance between the discharge aperture and the object.

17. Apparatus according to claim 10 wherein each locator means is pivotally mounted on its associated gage jaw and includes means forming a plurality of first chambers, each of the first chambers having an inlet passageway and a discharge aperture, each discharge aperture being operatively associated with the object being measured when the gaging apparatus is in gaging relation to the object, and means forming a second chamber communicating with each of the inlet passageways and adapted to be connected to a source of fluid under pressure, the inlet passageways forming restrictions for fluid flowing therethrough from the second chamber to the first chambers, whereby the pressure in each first chamber is proportional to the distance between its associated discharge aperture and the object.

18. Apparatus according to claim 17 wherein each locator means is formed with a substantially planar exterior surface, the discharge apertures of all of the first chambers of each locator means being disposed in the planar surface, and the planar surfaces of the locator means being in spaced facing relation to each other.

19. Gaging apparatus for measuring the size of an object moving relative to the gaging apparatus comprising:
a pair of gage jaws disposed in spaced relation to each other and adapted to be placed on opposite sides of the object to be measured,
means for mounting the gage jaws for movement together with respect to the object,
air jet means mounted on each gage jaw for sensing the distance between the gage jaw and the object,
means coupled to the gage jaws for maintaining the air jet means at a predetermined spacing,
locator means pivotally mounted to each gage jaw for maintaining the air jet means substantially equidistant from the object,
means forming at least one first chamber in each locator means, each first chamber having an inlet passageway and a discharge aperture, each discharge aperture being partially closed by the object being measured when the gaging apparatus is in gaging relation to the object, and
means forming a second chamber communicating with each inlet passageway and adapted to be connected to a source of fluid under pressure, the inlet passageways forming restrictions for fluid flowing therethrough from the second chamber to the first chambers, whereby the pressure in each first chamber is proportional to the distance between its associated discharge aperture and the object.

20. Apparatus for locating a gage jaw at a predetermined distance from an object to be measured comprising:
means mounted on the gage jaw for urging the gage jaw away from the object with a force proportional to the distance between the gage jaw and the object by producing a pressure on a surface coupled to the gage jaw and disposed in spaced facing relation to the object proportional to the distance between the surface and the object, the entire urging force exerted on the gage jaw being developed by the pressure produced on the surface disposed in spaced facing relation to the object, and
means for damping relative motion between the gage jaw and the object.

21. Apparatus according to claim 20 including means for urging the gage jaw toward the object with a force which balances the force exerted on the gage jaw by the means for urging the gage jaw away from the object when the gage jaw is spaced at the predetermined distance from the object.

22. Gaging apparatus for measuring the size of an object adapted to be placed in gaging relation to the object comprising:
a pair of gage jaws disposed in spaced relation to each other and adapted to be placed on opposite sides of the object,
anti-friction means mounting the gage jaws for movement together with respect to the object,
air jet means mounted on each gage jaw for sensing the distance between the gage jaw and the object, and
means for applying a correcting force to each gage jaw in response to displacement of the gage jaws from a position in which the air jet means are substantially equidistant from the object, the correcting force being applied in a frictionless manner and being proportional to the degree of displacement.

23. A method of measuring the size of an object comprising the steps of:
setting a pair of opposed gage jaws at a predetermined spacing, placing the gage jaws in spaced relation to and on opposite sides of the object,
maintaining the gage jaws substantially equidistant from the object while maintaining said predetermined spacing between them,
damping relative motion between each gage jaw and the object, and
sensing the distance between each gage jaw and the object.

References Cited

UNITED STATES PATENTS

| | | | |
|---|---|---|---|
| 3,321,838 | 5/1967 | Albertson | 73—37.5 XR |
| 3,364,728 | 1/1968 | Albertson et al. | 73—37.5 |
| 3,194,055 | 7/1965 | Knobel | 73—37.7 XR |
| 3,400,573 | 9/1968 | Matter | 73—37.5 |

S. CLEMENT SWISHER, Primary Examiner

W. A. HENRY, Assistant Examiner